United States Patent
Nakashiba

[19]

[11] Patent Number: 5,943,095
[45] Date of Patent: Aug. 24, 1999

[54] METHOD FOR OPERATING CHARGE-COUPLED DEVICE AT HIGH SPEED

[75] Inventor: Yasutaka Nakashiba, Tokyo, Japan

[73] Assignee: NEC Corporation, Tokyo, Japan

[21] Appl. No.: 08/827,505

[22] Filed: Mar. 28, 1997

[30] Foreign Application Priority Data

Mar. 29, 1996 [JP] Japan .................................. 8-076086

[51] Int. Cl.⁶ .................................................. H04N 5/335
[52] U.S. Cl. .......................... 348/311; 348/294; 348/236
[58] Field of Search ................................... 257/236, 246, 257/247; 348/207, 294, 295, 297, 298, 311, 312, 316, 317, 320, 321, 322, 323; H04N 5/335

[56] References Cited

U.S. PATENT DOCUMENTS

| | | | |
|---|---|---|---|
| 4,949,143 | 8/1990 | Iesaka et al. | 348/311 |
| 5,517,244 | 5/1996 | Stekeleburg et al. | 348/305 |
| 5,528,291 | 6/1996 | Oda | 348/220 |

FOREIGN PATENT DOCUMENTS 4-72762  3/1992  Japan .

*Primary Examiner*—Tuan V. Ho
*Attorney, Agent, or Firm*—Foley & Lardner

[57] ABSTRACT

An image sensor comprises an array of photodiodes and corresponding transfer cells for receiving charge packets from the photodiodes. Each of the transfer cells includes first, second and third electrodes arranged in sequence along a semiconductor channel, wherein the first and third electrodes have substantially equal time constants, and the second electrode has a lower electrical resistance than the first and third electrodes. With the charge packets being transferred to the transfer cells, first and second pulse sequences are respectively applied to the first and third electrode, of each transfer cell, and a constant potential is applied to the second electrode, wherein the first and second pulse sequences have a 90-degree phase difference with respect to each other.

8 Claims, 4 Drawing Sheets

METHOD FOR OPERATING CHARGE-COUPLED DEVICE AT HIGH SPEED

BACKGROUND OF THE INVENTION

1. Field of the Invention

The present invention relates generally to charge-coupled devices, and more specifically to a method for improving the speed of operation of charge-coupled devices.

2. Description of the Related Art

For input devices such as digital cameras for personal computers, scan conversion from the interlace to noninterlace format is necessary since most of these devices are implemented with components used in the standard television systems, whereas the computers are noninterlace-format devices. In order to eliminate the need for scan conversion, the noninterlaced (progressive) scan format is increasingly adopted by current CCD imaging devices.

Japanese Laid-Open Patent Specification Hei-4-72762 describes a progressive-scan CCD imaging device using three-phase clock pulses for driving three electrodes of each cell for shifting charge packets along vertical shift registers (vertical CCDs) to a horizontal CCD. However, due to the large difference between the time constants of these electrodes, charge packets suffer undesirable effects such as distortion and delays. Therefore, the operating speed of the vertical CCDs is limited, resulting in a low charge transfer efficiency.

SUMMARY OF THE INVENTION

It is therefore an object of the present invention to provide a method for operating a charge transfer device at a high speed.

According to a first aspect of the present invention, there is provided a method for shifting charge packets along a series of transfer cells, each of the transfer cells comprising first, second and third electrodes arranged in sequence along a semiconductor channel, the first and third electrodes having substantially equal time constants, and the second electrode of each transfer cell having a lower electrical resistance than the first and third electrodes, wherein the method comprises applying first voltage pulses to the first electrode of each transfer cell and second voltage pulses to the third electrode of each transfer cell, and applying a constant potential to the second electrode of each transfer cell, there being a predetermined amount of phase difference between the first and second voltage pulses.

According to a second aspect, the present invention provides a method for operating an image sensor comprising an array of photodiodes and a plurality of transfer cells corresponding respectively to the photodiodes. Each of the transfer cells comprises first, second and third electrodes arranged in sequence along a semiconductor channel, the first and third electrodes having substantially equal time constants, and the second electrode of each transfer cell having a lower electrical resistance than the first and third electrodes. The method comprises shifting charge packets from the photodiodes to the corresponding transfer cells, and applying first voltage pulses to the first electrode of each transfer cell and second voltage pulses to the third electrode of each transfer cell, and applying a constant potential to the second electrode of each transfer cell, there being a predetermined amount of phase difference between the first and second voltage pulses.

BRIEF DESCRIPTION OF THE DRAWINGS

The present invention will be described in further detail with reference to the accompanying drawings, in which.

DETAILED DESCRIPTION

Figure 1:
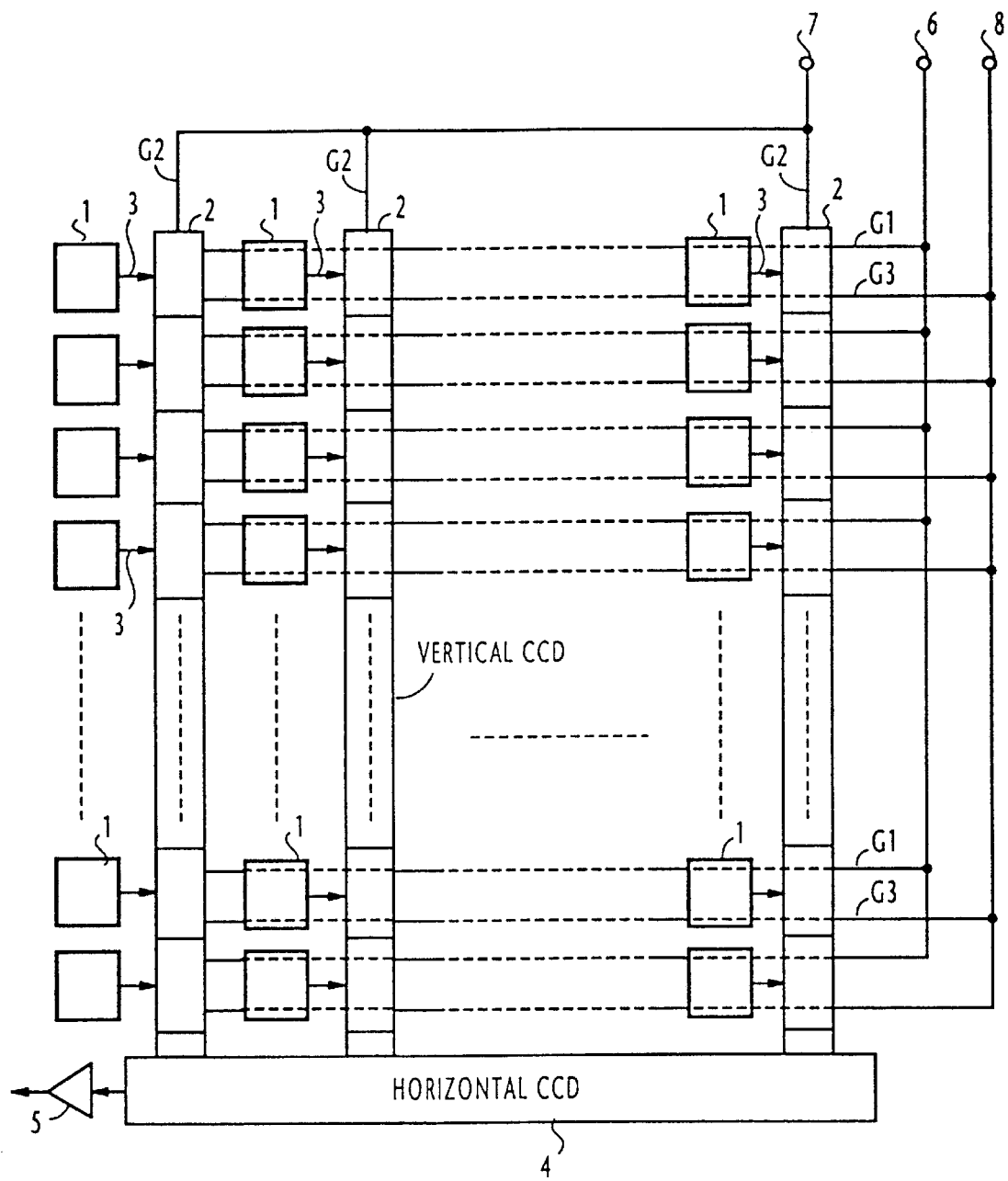
FIG. 1 is a schematic illustration of a two-dimensional CCD (charge-coupled device) image sensor.
Figure 2:
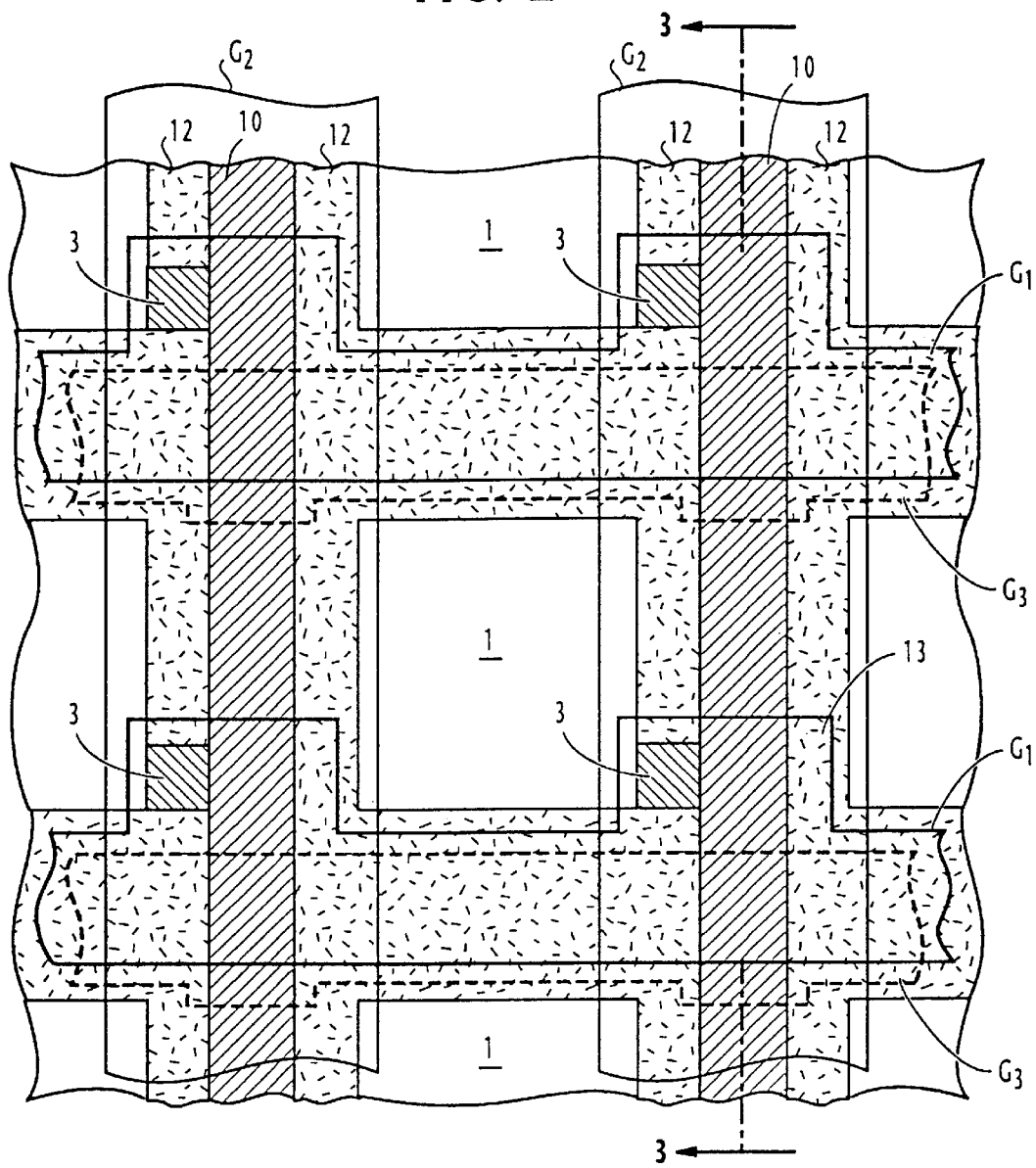
FIG. 2 is a plan view of a portion of the apparatus of FIG. 1.
Figure 3:
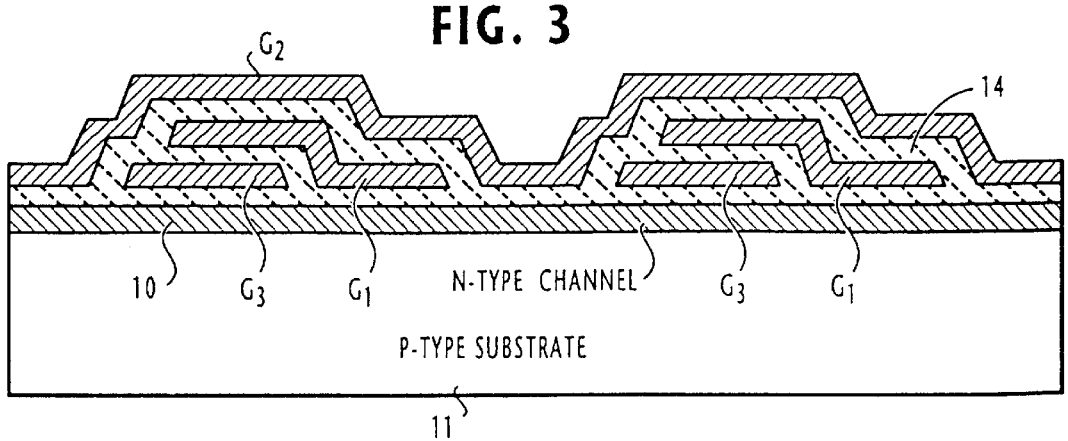
FIG. 3 is a cross-sectional view taken along the line 3—3 of FIG. 2.
Figure 4:
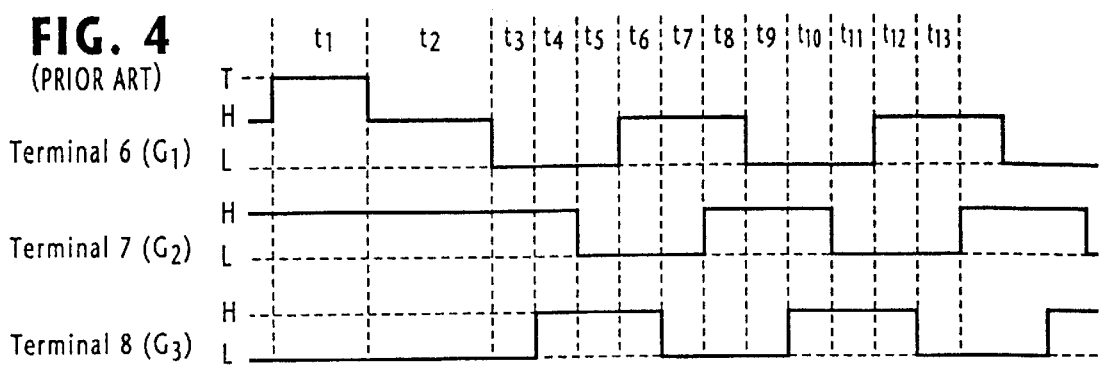
FIG. 4 is a timing diagram of three-phase clock signals used for operating the apparatus of FIG. 1 according to the prior art method.
Figure 5:
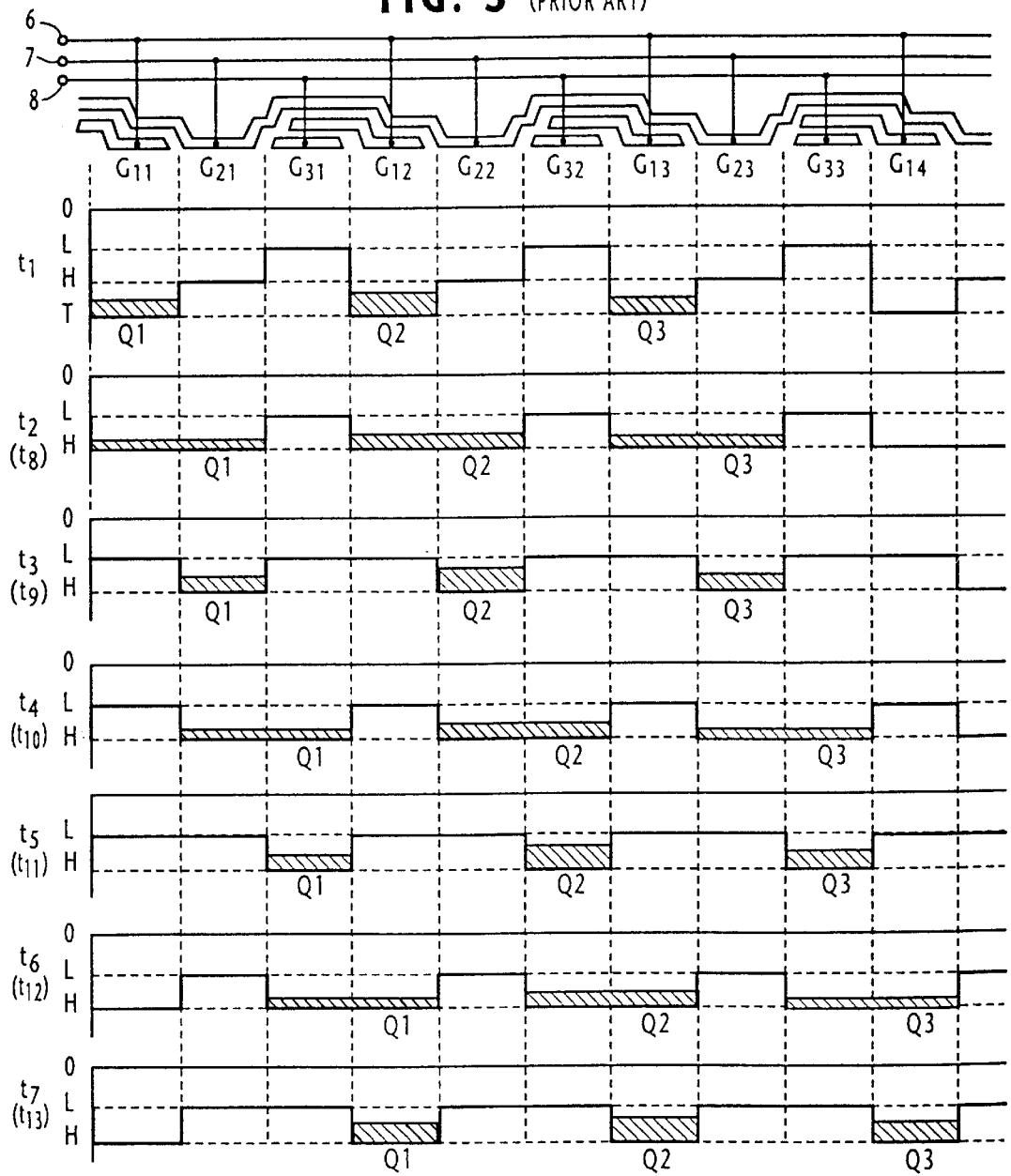
FIG. 5 is a potential diagram showing potentials successively produced as a result of the application of the signals of FIG. 4.

Before proceeding with the description of the method of the present invention, it may prove helpful to provide an explanation of a two-dimensional CCD image sensor with reference to FIGS. 1, 2 and 3 and the prior art method with reference to FIGS. 4 and 5.

In FIGS. 1 to 3, the two-dimensional CCD image sensor has a matrix array of photodiodes 1 and a plurality of vertical shift registers, or vertical CCDs 2 which are formed by n-type channels 10 embedded in a p-type silicon substrate 11 and gate electrodes $G_1$, $G_2$ and $G_3$, so that each vertical CCD 2 has a series of charge transfer cells. These transfer cells are connected to corresponding photodiodes 1 via transfer gates 3. Gate electrodes $G_1$ and $G_3$ of polysilicon extend horizontally to connect the transfer cells of the same rows to terminals 6 and 8. Gate electrodes $G_2$, which are formed of aluminum and connected to a terminal 7, extend over vertical CCDs 2 to additionally serve as a light shield to prevent intrusion of light to channel stoppers 12.

During a horizontal blanking period, the transfer cells of the vertical CCDs 2 are triggered to receive electrical charges, or charge packets from the corresponding photodiodes 1. The charge packets stored in all vertical CCDs 2 are shifted down to a horizontal shift register, or horizontal CCD 4. During a horizontal scan period, the charge packets in the horizontal CCD 4 are sequentially delivered through its transfer channel to an amplifier 5 and applied to external circuitry, not shown.

As illustrated in FIG. 2, photodiodes 1 are formed by a lower n-type layer and an upper $p^+$-type layer within the rectangular areas defined by the channel stoppers 12. Electrodes $G_1$ and $G_3$ run parallel to each other over the horizontally extending channel stoppers 9 and intersect the underlying n-type channels 10 in charge transfer relationship. Electrodes $G_1$ are the read gates and for this purpose they are formed with vertical extensions 13 connected to transfer gates 3.

As illustrated in FIG. 3, electrodes $G_2$ are in a charge-coupled relationship with portions of the n-type channel 10 which lie between successive rows of the matrix, and electrodes $G_1$ and $G_2$ are arranged to follow those portions of electrodes $G_3$ to form the individual cells of the vertical CCDs 2. Electrode layers $G_1$, $G_2$ and $G_3$ are insulated from each other and from the channel 10 by interlayer insulation 14.

In FIG. 4, during a period $t_1$ of a horizontal blanking interval, the terminal 6 is supplied with an excitation pulse having a triggering level T and terminals 7 and 8 are maintained at high (H) and low (L) potentials, respectively. All electrodes $G_1$ are raised to a potential sufficient to turn on the corresponding transfer gates 3, and all charge packets are transferred from photodiodes 1 to corresponding cells of the vertical CCDs 2. As a result, charge packets Q1, Q2 and Q3, for example, are stored in the n-type channel below electrodes $G_{11}$, $G_{12}$ and $G_{13}$, respectively, as shown in FIG. 5.

During period $t_2$, the potential at terminal 6 is lowered from trigger level to level H. Since electrodes $G_1$ and $G_2$ are at equi-potential, portions of the charge packets Q1, Q2, Q3 move to electrodes $G_{21}$, $G_{22}$ and $G_{23}$, respectively. The remaining portions of the charge packets are then moved to electrodes $G_{21}$, $G_{22}$ and $G_{23}$ during the next period $t_3$ when the potential at terminal 6 is driven to low level.

During period $t_4$, terminal 8 is raised to level H, while terminals 6 and 7 are maintained at low and high levels, respectively. Since terminals 6 and 8 are equi-potential, portions of the charge packets Q1, Q2, Q3 move to electrodes $G_{31}$, $G_{32}$ and $G_{33}$, respectively. During period $t_5$, terminal 8 is driven to high level, causing the remaining portions of the charge packets to move to electrodes $G_{31}$, $G_{32}$ and $G_{33}$, completing a moving cycle. During period $t_6$, both terminals 6 and 8 are at high level, portions of and charge packets Q1, Q2, Q3 move from $G_{31}$ to $G_{12}$, from $G_{32}$ to $G_{13}$ and from $G_{33}$ to $G_{14}$. The remaining portions of the charge packets are then moved to electrodes $G_{12}$, $G_{13}$ and $G_{14}$ during the next period $t_7$ when terminal 8 is switched to low level.

During periods $t_8$ to $t_{13}$, clock voltage pulses having similar patterns to those of periods $t_2$ to $t_7$ are successively applied to terminals 6, 7 and 8. It is seen that charge packet Q1, for example, moved from electrode $G_{31}$ to electrode $G_{32}$ during periods $t_6$ to $t_{11}$. Therefore, the prior art method requires six periods (timing events) to move charge packets from one cell to the next. In addition, electrodes $G_2$ have much smaller time constant than polysilicon electrodes $G_1$ and $G_3$, charge packets suffer from distortion and delays as they are shifted down the vertical CCDs 2.

In order to overcome these shortcomings, the present invention provides a novel method for shifting charge packets along the vertical CCDs 2 at a high speed.

Figure 6:
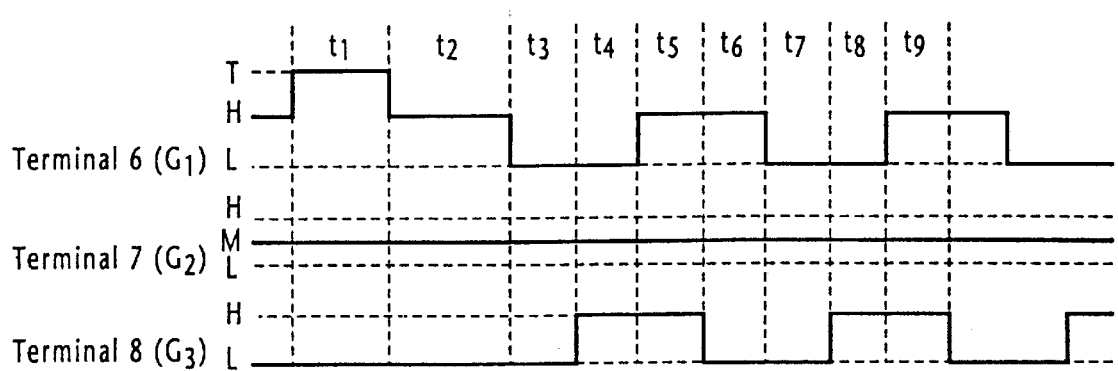
FIG. 6 is a timing diagram of signals used for operating the apparatus of FIG. 1 according to the present invention.

According to the present invention, terminal 7 is supplied with a constant DC voltage to maintain all metal electrodes $G_2$ at a medium voltage level (M) which lies between high and low levels, while clock voltage pulses having a 90-degree phase difference are applied to terminals 6 and 8 as shown in FIG. 6.

Figure 7:
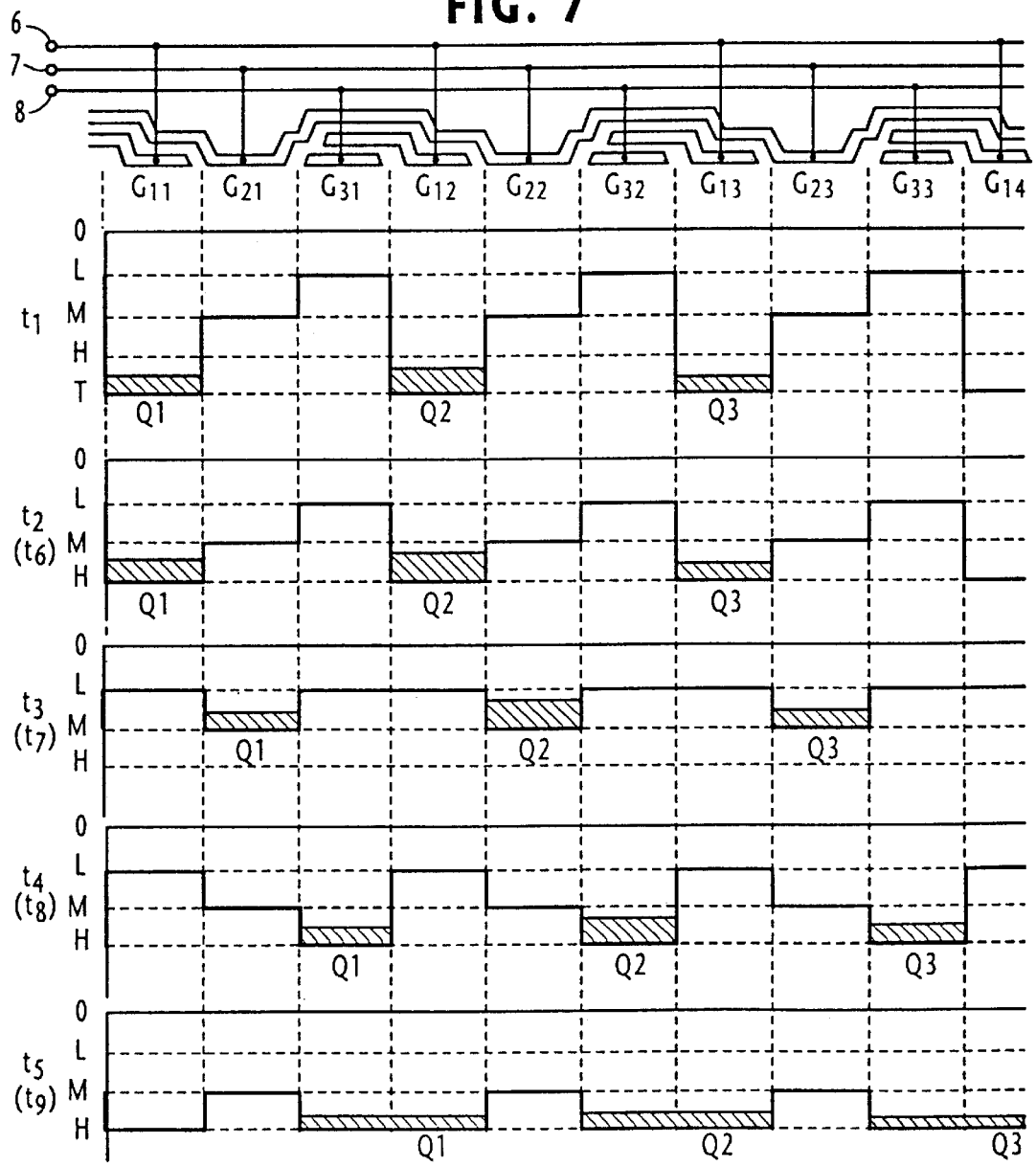
FIG. 7 is a potential diagram showing potentials successively produced as a result of the application of the signals of FIG. 6.

Specifically, during period $t_1$, the terminal 6 is supplied with the excitation pulse of triggering level T and terminals 7 and 8 are maintained at high and low levels, respectively. Thus, charge packets Q1, Q2 and Q3 are stored in the n-type channel below electrodes $G_{11}$, $G_{12}$ and $G_{13}$, respectively (FIG. 7), and during subsequent period $t_2$, terminal 6 is lowered to level H. Since electrodes $G_1$ are maintained at a higher potential than electrodes $G_2$, the charge packets stay in the positions of period $t_1$.

During period $t_3$, terminal 6 is driven to level L, producing a potential difference (=M−L) between electrodes $G_1$ and $G_2$. As a result, the charge packets Q1, Q2, Q3 move to electrodes $G_{21}$, $G_{22}$ and $G_{23}$.

During period $t_4$, terminal 8 is raised to level H, while terminal 6 is maintained at level L, producing a potential difference (=H−M), the charge packets Q1, Q2, Q3 move to electrodes $G_{31}$, $G_{32}$ and $G_{33}$, respectively, completing a moving cycle of charge packets within a transfer cell.

During period $t_5$, the potential at terminal 6 is raised to level H, while terminal 8 is maintained at high level. Since electrodes $G_1$ and $G_3$ are at equi-potential, portions of the charge packets Q1, Q2, Q3 move from $G_{31}$ to $G_{12}$, from $G_{32}$ to $G_{13}$ and from $G_{33}$ to $G_{14}$. The remaining portions of the charge packets are then moved to electrodes $G_{12}$, $G_{13}$ and $G_{14}$ during the next period $t_6$ when the potential at terminal 6 is driven to high level.

During periods $t_6$ to $t_9$, voltage pulses having similar patterns to those of periods $t_2$ to $t_5$ are applied to terminals 6 and 8, so that during periods $t_6$ to $t_8$ the charge packets are moved successively in similar patterns to those of periods $t_2$ to $t_4$ to complete a moving cycle within the next transfer cell.

It is seen that the same moving pattern occurs at every four timing events whereas the prior art requires six timing events. Therefore, the present invention relaxes the timing requirement and allows the vertical CCDs to operate at higher speeds. In addition, since electrodes $G_1$ and $G_3$ of polysilicon have substantially the same time constant and voltage pulses are supplied to these electrodes, charge packets suffer less distortion as they are shifted down the vertical CCDs 2.

What is claimed is:

1. A method for shifting charge packets along a series of transfer cells, each of the transfer cells comprising first, second and third electrodes ($G_1$, $G_2$, $G_3$) arranged in sequence along a semiconductor channel (10), said first and third electrodes having substantially equal time constants, and the second electrode of each transfer cell having a lower electrical resistance than said first and third electrodes, the method comprising applying first voltage pulses to the first electrode of each transfer cell and second voltage pulses to the third electrode of each transfer cell, and applying a constant potential to the second electrode of each transfer cell, there being a predetermined amount of phase difference between said first and second voltage pulses.

2. A method as claimed in claim 1, wherein said predetermined amount of phase difference is 90 degrees.

3. A method as claimed in claim 1, wherein said constant voltage is lower than a high potential level of said first and second voltage pulses and higher than a lower potential level of said first and second voltage pulses.

4. A method as claimed in claim 1, wherein said first and third electrodes are formed of polysilicon and said second electrode is formed of conductive material.

5. A method for operating an image sensor comprising an array of photodiodes (1) and a plurality of transfer cells corresponding respectively to said photodiodes, each of the transfer cells comprising first, second and third electrodes ($G_1$, $G_2$, $G_3$) arranged in sequence along a semiconductor channel (10), said first and third electrodes having substantially equal time constants, and the second electrode of each transfer cell having a lower electrical resistance than said first and third electrodes, the method comprising:

shifting charge packets from said photodiodes to the corresponding transfer cells; and applying first voltage pulses to the first electrode of each transfer cell and second voltage pulses to the third electrode of each transfer cell, and applying a constant potential to the second electrode of each transfer cell, there being a predetermined amount of phase difference between said first and second voltage pulses.

6. A method as claimed in claim 5, wherein said predetermined amount of phase difference is 90 degrees.

7. A method as claimed in claim 5, wherein said constant voltage is lower than a high potential level of said first and second voltage pulses and higher than a lower potential level of said first and second voltage pulses.

8. A method as claimed in claim 5, wherein said first and third electrodes are formed of polysilicon and said second electrode is formed of conductive material.

\* \* \* \* \*